United States Patent
Graf et al.

[19]

[11] Patent Number: 6,125,314
[45] Date of Patent: Sep. 26, 2000

[54] DRIVE TRAIN CONTROLLER FOR A MOTOR VEHICLE

[75] Inventors: Friedrich Graf, Regensburg; Gregor Probst, Landshut, both of Germany

[73] Assignee: Siemens Aktiengesellschaft, Munich, Germany

[21] Appl. No.: 09/120,021

[22] Filed: Jul. 20, 1998

Related U.S. Application Data

[63] Continuation of application No. PCT/DE97/02598, Nov. 7, 1997.

[51] Int. Cl.$^7$ .................................................. B60K 41/28
[52] U.S. Cl. ................................................ 701/53; 701/57
[58] Field of Search ................................ 761/53, 54, 51, 761/58, 60, 65, 57, 84, 87, 22

[56] References Cited

U.S. PATENT DOCUMENTS

| | | | |
|---|---|---|---|
| 5,021,959 | 6/1991 | Jundt et al. | 701/105 |
| 5,101,350 | 3/1992 | Tokoro | 701/57 |
| 5,410,477 | 4/1995 | Ishii et al. | 701/48 |
| 5,508,924 | 4/1996 | Yamashita | 701/22 |
| 5,521,823 | 5/1996 | Akita et al. | 701/36 |
| 5,611,310 | 3/1997 | Kuroda et al. | 123/399 |

FOREIGN PATENT DOCUMENTS

| | | |
|---|---|---|
| 40 29 517 A1 | 8/1991 | Germany. |
| 44 01 416 A1 | 7/1995 | Germany. |

OTHER PUBLICATIONS

"Fuzzy Logic" (Altrock), Technology, vol. 1, pp. 75–86; (month and year are not available).

"Active chassis techniques" (Wallentowitz), Progress in Motor Vehicle Techniques, Jun. 1991, pp. 110–123.

"Automobile system networks" (Leonhard), F&M, vol. 101, No. 3, pp. 87–90. (month and year are not available).

*Primary Examiner*—Tan Nguyen
*Attorney, Agent, or Firm*—Herbert L. Lerner; Laurence A. Greenberg; Werner H. Stemer

[57] ABSTRACT

The drive train controller is used to calculate the position of the accelerator pedal which is interpreted as the wheel torque or transmission output torque desired by the driver, in order to calculate setpoint values for the torque to be output by the drive train. It contains a control circuit in which the desired wheel torque is evaluated, together with further operating parameters of the motor vehicle, in a fuzzy system. It outputs an output signal by which the wheel torque to be exerted on the roadway by the wheels of a motor vehicle is defined.

12 Claims, 6 Drawing Sheets

1': Accelerator pedal position (act)
2': Vehicle speed in longitudinal direction
3': Driving situation/road type
4': Gear speed/transmission ratio (act)
5': Gear shift position and/or state of transmission
6': Drive type
7': Driving style
8': Change state in drive, transmission
9': Mwheel,setp,stead
11': Transversal acceleration

DRIVE TRAIN CONTROLLER FOR A MOTOR VEHICLE

CROSS-REFERENCE TO RELATED APPLICATION

This application is a continuation of International Application PCT/DE97/02598, filed on Nov. 7, 1997, which designated the United States.

BACKGROUND OF THE INVENTION

FIELD OF THE INVENTION

The invention relates to a drive train controller for a motor vehicle.

Control systems for an engine, a transmission and auxiliary assemblies of a motor vehicle are known to operate largely independently of each other, for example, they constitute the working point and the mode of operation of the controlled assembly largely independently of one another. Devices are available which allow communications between the individual components of the drive train of a motor vehicle, for example in the form of a CAN bus or the like, but they are predominantly used only to exchange sensor data. In addition, the controllers influence one another by communicating during specific operations, for example in order to improve gear shifting performance (comfort) the engine torque is reduced when the gear transmission ratio is changed.

Further examples include the control of engine torque during braking or a reduction of the engine torque during the occurrence of drive slip. A proposal to interlink systems in an automobile, where the interlinking is aimed at obtaining an integrated drive train controller for a motor vehicle, is known from an article by R. Stuttgart, titled "Systemvernetzung im Automobil" [Automobile System Networks], F & M 101(1993)3, pages 87 to 90). The article teaches using the position of the gas pedal to be interpreted as an indicator of an amount of wheel torque desired by the driver and is used to calculate set point values for the engine and for the transmission of the motor vehicle. The objective of the article is the optimization of the engine controller, electronic gas pedal and transmission controller subsystems which are proposed therein to reduce the fuel consumption and to improve the driving characteristics of the motor vehicle, in particular in relation to the spontaneous reaction to movements of the gas pedal.

In the drive train controller disclosed in German Published, Non-Prosecuted Patent Application DE 196 37 210 A1, corresponding to pending U.S. application Ser. No. 08/937,253, filed Sep. 12, 1997, the central reference variable is a set point wheel torque which is defined by the driver by a specific position of the accelerator pedal (steady-state) and by accelerator pedal dynamics, i.e. by the manner and speed of changes in the position of the accelerator pedal.

SUMMARY OF THE INVENTION

It is accordingly an object of the invention to provide a drive train controller for a motor vehicle which overcomes the above-mentioned disadvantages of the prior art devices of this general type, in which an accelerator pedal position which is prescribed by the drive of a motor vehicle is converted into a set point wheel torque to be transmitted to the roadway. This can be determined either for one of the driven wheels individually or as a total for all the driven wheels.

With the foregoing and other objects in view there is provided, in accordance with the invention, in a motor vehicle having a drive train including an engine, a transmission, a torque converter, and wheels, a braking system with delaying units, a brake pedal and an accelerator pedal, a drive train controller including: a wheel torque calculation circuit to be connected to the accelerator pedal for interpreting the position of the accelerator pedal as one of a desired wheel torque and a desired transmission output torque desired by a driver and for calculating set point values for a torque output of the drive train; a control circuit has a fuzzy system and a central driving strategy selector circuit, the fuzzy system receives and evaluates the desired wheel torque, together with operating parameters of the motor vehicle and environmental parameters, for generating a fuzzy output signal; the central driving strategy selector circuit receives the fuzzy output signal from the fuzzy system and driving situation parameters of the motor vehicle and generates a wheel torque output signal using prescribable criteria of the central driving strategy selector circuit for adapting a mode of operation of the drive train; and an engine power adjusting unit receiving the wheel torque output signal to determine a set point wheel torque to be exerted on a roadway by the wheels.

The control of the drive train by prescribing a set point wheel torque provides the advantage that both the engine point and the operating point of the transmission are not prescribed directly but rather can be combined freely according to prescribed criteria. All that is necessary is compliance with the condition that Mwheel,setp=Meng,setp$(k)*iG(k)$, where $M_{eng,setp}(k)$=set point engine torque for a combination k, and $iG(k)$=transmission ratio for the combination k.

A further advantage of the invention is that it makes it possible to improve the operation of a motor vehicle on a global basis. A strategy for the engine controller, the engine power adjusting unit and the transmission controller is defined centrally such that the emission of pollutants (hydrocarbons, nitrogen oxides etc.) is minimized, particularly in urban areas. The objective of a central strategy can also be a power-oriented driving mode of the motor vehicle. With this strategy, all the decentralized functional units are set such that the best possible acceleration and rapid response of the drive to the driver's wishes are available. Such a mode is necessary for a sporty driving style and when driving on positive gradients.

In accordance with an added feature of the invention, the set point wheel torque defines a unique set point wheel torque for each individual wheel of the motor vehicle.

In accordance with another feature of the invention, there is a scaling circuit which receives the fuzzy output signal and generates a scaled fuzzy output signal, the scaling circuit defines an upper limit corresponding to a maximum accelerator pedal position for a respective maximum wheel torque to be output as a function of a driving and an operating situation of the motor vehicle.

In accordance with an additional feature of the invention, there is a filter having a type and filter parameters are defined as a function of the driving and the operating situation of the motor vehicle, the filter receives and filters the scaled fuzzy output signal.

In accordance with another added feature of the invention, the wheel torque calculation circuit receives input signals from the accelerator pedal and the brake pedal to determine the position of the accelerator pedal and of the brake pedal and generates central control parameters for the engine adjusting unit and the delaying units of the drive train are from the input signals.

In accordance with another additional feature of the invention, there is a classification device for evaluating sensor signals received from the drive train, classifying operating parameters of the motor vehicle and generating classification device output signals.

In accordance with yet another feature of the invention, the control circuit receives the classification device output signals and a driving strategy is selected in the control circuit with reference to the classification device output signals; and including a plurality of decentralized control units receiving output signals of the wheel torque calculation circuit and of the control circuit, and control signals for at least one of the engine, the transmission, and the brake system are generated from the output signals.

In accordance with yet another added feature of the invention, a given set point wheel torque of operating points of the engine, of the transmission, of the brake system and of the torque converter are controlled for fulfilling the following relation:

$$M_{wheel\text{-}setp} = M_{eng\text{-}setp} * i_A * i_G * wv - F_{brake} * r$$

where:

$M_{wheel\text{-}setp}$ is the setpoint wheel torque $M_{eng\text{-}setp}$ is the setpoint engine torque $i_A$ is the differential transmission ratio $i_G$ is the gear transmission ratio r is the wheel radius wv is the amplification factor of the torque converter $F_{brake}$ is the braking force to be set.

In accordance with a further added feature of the invention, the set point wheel torque is kept constant at one value in the event of a gear change or the set point wheel torque is approximated, in accordance with a prescribed time function, to a current value supplied by the fuzzy system, in particular, after a phase of remaining constant.

In accordance with a concomitant feature of the invention, the motor vehicle has a hybrid drive and the control circuit selects a drive source of the hybrid drive.

Other features which are considered as characteristic for the invention are set forth in the appended claims.

Although the invention is illustrated and described herein as embodied in a drive train controller for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
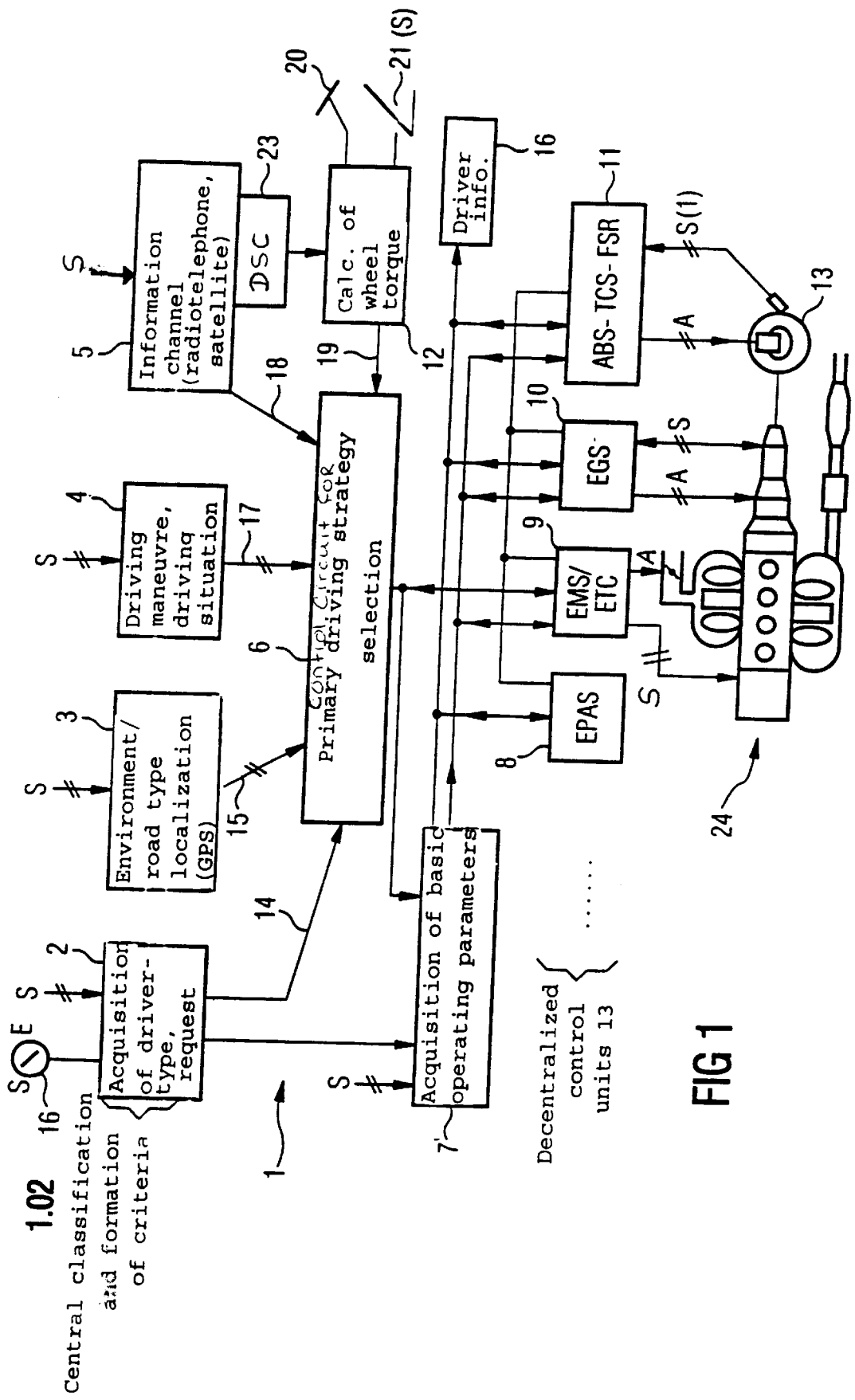
FIG. 1 is a block diagram of an integrated drive train controller in accordance with the invention.

Referring now to the figures of the drawing in detail and first, particularly, to FIG. 1 thereof, there is shown an integrated drive train controller 1 with the below identified components. For the sake of legibility, the designations "circuit" or "block" will frequently be avoided with reference to the individual circuit or programming components, for example, "selector" instead of "selector circuit".

A central classification and criteria form 1.02 includes a driver-style (type) and driver-wish acquisition circuit 2, an environment-type and road-type location circuit 3 (for example a GPS), a driving-maneuver and driving-situation detector 4 and an information channel 5 (for example a radio telephone or a satellite receiver). The signals from various sensors in a motor vehicle, which signals are referred to here symbolically by S, are fed via corresponding signal lines to the circuits 2 to 5 and to further circuit components (yet to be described) of the drive train controller 1. The signal lines are indicated in the drawing as multiple lines, and they may also be implemented as a data bus.

A control circuit 6, which makes a primary driving strategy selection is also designated as a primary driving strategy selector 6, receives output signals of the circuits 2 to 5 mentioned above via lines 14, 15, 17 and 18. Via a line 19, the control circuit 6 receives the output signal of a wheel torque calculator 12, which itself receives signals from a brake pedal 20 and an accelerator pedal 21.

The wheel torque calculator 12 carries out dynamic influencing by the signal on line 19. Decisive factors include not only influencing variables which influence the set point wheel torque but also the speed with which the increase or decrease in the wheel torque takes place. Here, it is possible to use conventional filters (for example of the 1st order) whose time constants are defined by the external influencing variables and thus influence the signal dynamics on line 19. It is also advantageous to keep the set point wheel torque constant during specific operations or to approximate it to a current value from the information channel 5 in accordance with a prescribed time-dependent function (also after a phase of being kept constant, for example in the event of a gear change). This avoids the impression of the vehicle accelerating independently, i.e. without the intervention of the driver.

Output signals of the control circuit 6 are fed to a basic operating parameter acquisition device 7 and to an electronic engine controller and engine power adjusting unit (EMS/ETC) 9. Output signals of the basic operating parameter acquisition device 7 are fed to a driver information device or display 16, to an electrical power-assisted steering device (EPAS) 8, to the electronic engine controller and engine power adjusting unit 9, to an electronic transmission controller (EGS) 10 and to a brake controller 11. The brake controller 11 may include an ABS system, a traction control system TCS and a driving stability controller FSR.

The basic operating parameter acquisition device 7 then carries out a coordinated calculation of the central operating parameters of the entire drive train in accordance with the prescribed strategy from the control circuit 6. In the basic operating parameter acquisition device 7, transmission ratios and a set point engine torque, for example, are defined but also the type of drive and its individual operating points in the case of a hybrid drive. This permits a substantially more extensive control of the engine and the transmission than in the prior art. Thus, the engine torque can be set as a function of the transmission ratio. This makes the motor vehicle easier to drive since the driver no longer has to compensate for the loss of output torque by shifting up gears. However, this is also a way of effectively reducing emissions of pollutants (explanation follows below).

The coordinated definition of the operating parameters of the engine and transmission is given here not only in a steady-state (i.e. not only when there is a constant wheel torque demand from the wheel torque calculator 12) but also information relating to dynamic operations such as relating to cornering or to a transition to an over-run mode (vehicle speed is reduced in such a case) is also taken into account by the basic operating parameter acquisition device 7, in order to coordinate the downstream functional units 8–11. Thus, in the case of the overrun mode it is possible both to retain the current transmission ratio and at the same time activate the overrun fuel cut-off. In the case of extreme cornering, it is appropriate, in order to maintain driving stability, to fix the transmission ratio (–>EGS) and to dampen the load change in the drive (engine) or allow it to occur more slowly (–>EMS/ETC).

The centralization in terms of management of the driving characteristics and emissions should, however, only proceed as far as is necessary (prescription or delegation of strategies). All other functions run at the level of decentralized control units, as independently as possible (for example driving stability functions).

The control circuits and devices 8 to 11 generate adjustment signals with which the individual assemblies or components of a drive train 24 of the motor vehicle are controlled, i.e. the engine is controlled via its throttle valve, the transmission and the brakes of the motor vehicle. The adjustment signals are fed via lines A from the circuits 9 to 11 to the assemblies of the drive train 24. Sensor signals S are fed via corresponding lines to the aforesaid circuits. The control circuits and devices 8 to 11 can, however, also be combined with the respective assembly to be controlled as so-called local units, or may be integrated therein. Thus, it is, for example, in the case of an electrical brake actuator, appropriate to combine the brake controller 11 with the brake actuator. This does not change in any way the control function.

The individual components of the drive train 24 themselves are illustrated diagrammatically in FIG. 1. They are not explained further here since they are generally known. In the case of a hybrid drive,—i.e. an internal combustion engine combined with an electric motor—the former is coupled to the electric motor and to a generator. Such a hybrid drive is known, for example, from VDI report No. 1225, 1995, pages 281–297.

The functions of a global or combined drive train controller according to the invention are primarily as follows:
  Operating for minimized emissions (HC, NOx):
    a. The control circuit 6 sets the mode of operation of the entire drive train 24 to minimized emission of pollutants.
    b. A central "decision maker", i.e. the control circuit 6, calculates the main operating parameters of the circuits 9, 10 (EMS, ETC, EGS) in accordance with the prescription (defined operating rules (modes) and variables, and selection criteria for implementing the operating rules, etc.) such that the emission of pollutants is minimized (for example in urban areas). The prescription can be implemented by the downstream functional units in the following way:
      b1. ETC (electronic engine power controller): load changes of the internal combustion engine are damped (demanded by the wheel torque calculator 12) or the operating range is restricted. By avoiding nonsteady-state operations it is possible here for close-loop and open-loop controllers which have the purpose of reducing emissions to operate without faults. Operating ranges with a quantitively or qualitatively undesired composition of the emissions are avoided;
      b2. EMS (electronic engine controller): activation of a low-emission mode, for example reduction of the acceleration enrichment in the case of an internal combustion engine; or
      b3. change of type of drive (motor) (for example to electric motor, hydrogen drive);
    c. EGS (electronic transmission controller): brings about, in the internal combustion engine the greatest possible degree of steady-state operation in the region with the lowest emissions, for example with CVT or multi-stage transmission; and
    d. adaptation when changing the type of drive (for example electric motor, hydrogen drive, specifically coordinated by the basic operating parameter acquisition device 7). In particular in the case of this function, the significant factor is good interaction between the engine and transmission because the driver's demand permits a plurality of combinations of resulting engine torque and transmission ratio in view of the acceleration and speed. A matched profile of the variation in the two manipulated variables over time is also necessary.
  A power-orientated driving mode:
    In analogy with the operation for minimized emissions, all the decentralized functional units are set such that the best possible acceleration, rapid response of the drive to the driver's wishes (unrestricted type of drive) are available. This is necessary for a sporty driving style or traversing a positive gradient (i.e. hill).

FIG. 1 shows the architecture of such a division of functions. However, decisions of lower control levels which influence superordinate prescriptions are signaled to the higher control levels in so far as they are necessary. However, this is explained below in detail.

The driver-wish acquisition circuit 2 serves to acquire a driving style (type), i.e. a classification between power-orientated driving and economic driving. An example of such a function is described in European Patent Application No. 0 576 703 A1. A signal which characterizes the driving style of the driver is fed to the control circuit 6 via a line 14.

The environment-type and road-type location circuit 3 determines the road type (urban area/freeway/highway) and may also determine, for example, the general degree of air pollution by use of additional sensors. The locality of the vehicle is known by use of a Global Positioning System in conjunction with a digital card (on CD-ROM). This information is made available to the control circuit 6.

Detection, carried out in the driving-maneuver and driving-situation detector 4, of individual driving maneuvers such as cornering, positive gradient of the roadway, drive/braking slip, for example, and information relating to longitudinal and transversal stability can also be used to determine the selection of the driving strategy. This information can also be made available to the basic operating parameter acquisition device 7 so that a suitable mode of operation of the drive train 24 can also be achieved in the short term by medium term operational strategy. Here, the information for blocks 6 and 7 may also originate from decentralized control units (for example relating to the vehicle-movement dynamic stability of the ABS/TCS/FSR of the brake controller 11) or from the information channel 5. The information channel 5 makes information available which is provided by a central "control office", for example by a traffic supervisory authority. Thus, it is possible to control a low-emission mode of operation centrally.

The control circuit 6 serves to determine the primary driving strategy selection for the downstream basic operating parameter acquisition device 7, which in turn determines the central operating parameters for the decentralized control units in a coordinated fashion. The information on the lines 14, 15, 17 and 18 is processed with a fixed set of rules, in particular with a rule base of a fuzzy logic system. It is also possible to make an evaluation with mathematically formulated algorithms or with a neural network. (Further details on blocks 6, 9, 11 and 12 are explained with reference to FIG. 3).

The sensors S supply necessary signals both for the formation of the classification and the criteria in the top layer of the drive train controller 1, i.e. in the units 2–5 and to the decentralized control units for the individual assemblies. The localization of the sensors in terms of the functional blocks plays a subordinate role, insofar as communication between the sensor signal conditioning devices in the respective control unit and the information receivers is ensured. Which functional units are physically present and combined in which control unit is also unimportant in terms of the functional architecture. Thus, it is perfectly possible for the driver-style and driver-wish acquisition devices 2 to be integrated into the transmission controller (EGS) 10, while the environment-type and road-type classification devices 3 could be accommodated in the brake controller 11 (longitudinal and transversal dynamics controller).

Figure 2:
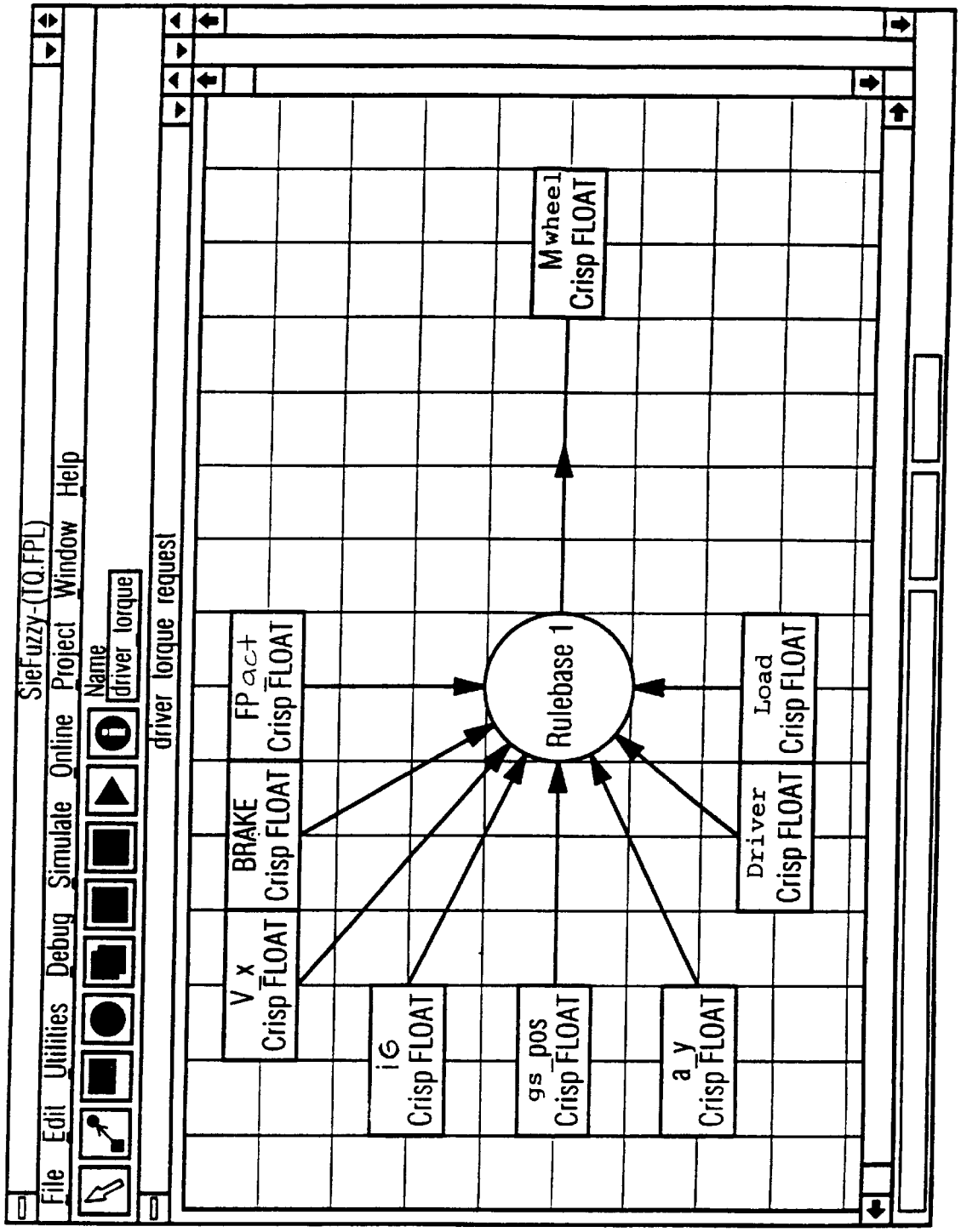
FIG. 2 is a chart of a fuzzy rule base used in the drive train controller.

In addition, a central computer can also contain the units 12, 6, 7. The virtual architecture, as illustrated in FIG. 2, is essential in order to obtain an overall improved function. An important role here is played by the communication between the physical units, which is expediently implemented as high-speed, serial bus communication (for example via a CAN bus).

The prescribed values which the driver issues by the accelerator pedal are converted in the wheel torque calculator 12 into a set point wheel torque prescribed value, i.e. into the torque which is to be transmitted onto the roadway by the drive wheels. The influence of environmental conditions, such as additional driving resistances (driving on an uphill gradient, load, etc.) will not be taken into account here in order to avoid alienating the driver from the physical reality.

The wheel torque calculator 12 is illustrated separately in FIG. 1, but it may also be physically accommodated in the decentralized control units 8–11 or 16 (for example EMS/ETC). The same applies to blocks 1–7. The signal on the line 19 can be output as a desired wheel torque or else as a set point wheel circumferential force or set point transmission output torque. Here, it is also possible, by use of continuous information on the brake pedal 20, to prescribe negative set point wheel torques or set point circumferential forces. Thus, an integrated management of the driving units (for example internal combustion engine, electric motor, rotating flywheel) or decelerating, energy-consuming units (for example service brake, power generator, stationary flywheel) is possible. As an alternative to the wheel torque being prescribed by the driver, it can also be prescribed by a driving speed controller 23 (abbreviated as DSC).

The information channels between the basic operating parameter acquisition device 7 and the units 9, 10 and 11 can be used bidirectionally. The reason for this is that the necessity to use not only external conditions, such as driver style, environment and driving maneuvers, as the basis for the calculation of the basic operating parameters, but also to take into account internal prescribed operating states of the controlled units in the drive. Thus, it is important, after a cold start, to operate the internal combustion engine at higher rotational speeds in order to promote the heating of the catalytic converter. In addition, additional heat sources (for example an electrically heated catalytic converter) constitute an additional load on the engine. Adjustment of the ignition toward a retarded setting after the cold start (the injection of secondary air under certain circumstances) for the same purpose changes the characteristic of the drive, which has to be taken into account by the basic operating parameter acquisition device 7 (for example by displacing gear shifting points to higher engine speeds).

Likewise, a specific operating state in the transmission can influence the calculation of its transmission ratio (for example cold gear oil when engaging the converter lockup; when the transmission is at an excess temperature, it is appropriate to displace the engine speeds into regions which increase the volume throughput rate of the oil pump of the transmission through the oil cooler). Other interventions into the engine torque, for example an increase in order to compensate the loss of torque as result of the air-conditioning compressor or losses of efficiency of the transmission (CVT: adjustment of the transmission ratio gives rise to higher pump power) take place at the control level represented by the blocks 8–11, insofar as they do not also have to be supported by measures in the basic operating parameter acquisition device 7.

As a result of the drive train controller 1 according to the invention, it is possible that only the gear shifting behavior when driving on a positive gradient and negative gradient or in the case of the driving power demand which is related to the driving style and the driving situation, but also the control of the entire drive train including drive sources, are subject to other criteria and are adapted thereto.

Thus, in critical situations and driving maneuvers it may be appropriate and necessary to adapt (retain) the current transmission ratio in a situation-related fashion, specifically independently of the general strategy which has just been established. In the control concept according to the invention, such dynamic corrections are functionally combined with the control of the engine (an example is the coordinated retention of a gear speed and activation of the engine overrun fuel cut-off).

It is appropriate not to include any engine-specific parameters in the wheel torque calculator 12, since, for example, in the case of a hybrid drive the selection of the type of drive is not yet eminent at this decision level. However, it is useful to include factors such as traction conditions (a winter mode, a $\mu$-split underlying surface) and, especially in the case of vehicles with powerful engines, to reduce somewhat the sensitivity of the system as a preventive measure (generate less wheel torque with the same accelerator pedal). Generally, the conversion of the accelerator pedal position into a wheel torque can be carried out with a fuzzy system which combines the multiple dependencies to form a set point wheel torque.

The advantages of the invention also lie in an integrated wheel torque management system which also operates the wheel torque as a negative value and influences both the drive sources and units which decelerate the vehicle. It is particularly simple in this context to provide a coupling to the brake systems with electrical brake actuation ("brake by wire").

Not only are the transmission ratios and the respective set point engine torque but also the type of drive and its individual operating points are defined in the basic operating parameter acquisition device 7. Here, not only is strong wheel torque-oriented operations possible according to the driver's prescribed values, but the real wheel torque can also be influenced or limited by a central prescription of the values for pollutant emissions. However, such interventions must be indicated to the driver by the driver information display 16 and as far as possible carried out without restricting the driving characteristics.

Blocks 2 to 7, 12 and 16 can be accommodated in independent, physical units (control units) or integrated into the units 8–11. This flexibility is a further advantage of the invention.

The exchange of data between the individual control units takes place on a torque basis. "Torque basis" is to be understood as follows: if, for example, a reduction in engine torque is demanded by the transmission, it transmits a variable to the engine controller which represents the desired torque, i.e. the desired engine torque, and does not, for example, demand a 5% reduction in the ignition angle. Conversely, in order to determine the engine torque at the current working point of, for example, the transmission controller, the throttle valve position and the engine speed, from which the transmission controller could determine the current engine torque by use of a matrix stored in the transmission controller, are not transmitted, but instead the engine controller transmits the current engine torque to the transmission controller via an interface (for example CAN).

Fuzzy logic is a particularly advantageous method for calculating, on a multi-criteria basis, the wheel torque signal (steady-state) $M_{wheel-setp,stead}$ which is to be output on the line 19. With the conventional characteristic diagram method it is possible to represent only three-dimensional relationships at best. However, this limitation is overcome with fuzzy logic. It is possible to integrate various premises in a rule which are logically linked with AND or OR operations. According to fuzzy logical methods, intermediate values are generated if these premises are not completely fulfilled. In this way, it is possible to generate intermediate values in a way similar to characteristic diagram interpolation. Furthermore, a plurality of rules can influence the end result simultaneously in such a way that the overall result is reduced or increased (for example by use of a centroid method for defuzzification).

An exemplary embodiment of a fuzzy rule base can be seen in FIG. 2; it is represented on the screen of a development system which is commercially available under the name SieFuzzy. Input variables of a fuzzy rule base Rule base 1 are physical variables with the following definitions:

| | |
|---|---|
| V_x | Vehicle speed in longitudinal direction |
| BRAKE | Position of brake pedal |
| FP_act | Position of accelerator pedal |
| iG | Transmission ratio |
| gs_pos | Gear shift position |
| a_y | Transversal acceleration |
| driver | Variable characterizing the driver style |
| load | Variable characterizing the load state of the motor vehicle |
| stwa | Steering wheel angle |
| Mwheel | Wheel torque |

"Crisp" means that the variables are numerical values (in contrast to linguistic variables) and FLOAT is the data type.

The rule base rule base 1 contains the following rules, partially in the form of an explanation, partially with a proceeding explanation, for the individual variables:

Rule 1 (relating to the actual accelerator pedal position):

The greater the degree of the deflection exerted by the driver, the greater will be the wheel torque and resulting vehicle acceleration and speed.

IF_V x IS greater than very_small AND FP_act IS large THEN Mwheel IS large

Rule 2 (relating to the vehicle speed):

At a very low driving speed it is useful to "dose" the wheel torque at a relatively low level in order to make the vehicle easier to drive during maneuvering.

IF V_x IS very_small AND FP_act IS large THEN Mwheel IS medium

Rule 3 (relating to the driving situation/road type), for example:

In the case of a slippery road surface it is likewise appropriate to reduce the set point wheel torque. This also applies if stop and go traffic is detected (improvement of the driving characteristics, "weaker response" of the drive). Otherwise, there may be a desire to assign a larger set point wheel torque to a specific accelerator pedal position when driving on a positive gradient or with an increased load, in order to maintain the driving sensation or the capability of the vehicle to react in the form of acceleration.

IF load IS large then Mwheel IS plus_medium

Rule 4 (relating to the gear speed, i.e. the transmission ratio):

It may be appropriate to reduce the set point wheel torque somewhat at higher gear speeds, even if this contradicts the basic idea of setting the torque at a wheel 13 independently of the gear speed. In fact, it is possible that many drivers will be disturbed by an automatic increase in the engine torque after shifting up a gear. On the other hand, there are types of transmission in which such an increase in torque after shifting up a gear has a rather disturbing effect (ASG: automated manual shift transmission: interruption in the traction force).

IF gear speed IS large THEN Mwheel IS minus_medium

Rule 5 (relating to the gear shift position):

In position "R" for the reverse gear it is appropriate to reduce the reactivity, likewise in N or P (non-frictionally engaging operation).

IF gs_pos IS (N or P or R) then Mwheel IS minus_large

Rule 6 (relating to the drive type):

If a hybrid drive is provided, it may be useful, in the case of a relatively weak drive source (for example electric motor), to reduce the sensitivity in order to increase the controllability. That is to say a smaller amount of wheel torque is produced with the same position of the accelerator pedal. With this rule it is possible to achieve a different scaling in the sense that the maximum wheel torque when the accelerator pedal is fully depressed is reduced.

IF Meng,max(t) IS small then Mwheel IS minus_medium

Rule 7 (relating to the driving style):

It is conceivable that a sporty driver desires a higher level of reactivity.

Rule 8 (relating to a change in state in the drive/transmission):

If there is a change in the gear shift position to the frictionally locking mode, it is useful, and promotes safety, to keep the wheel torque near 0 if the brake is not depressed.

IF ((gs_pos IS to_frict lock) AND (brake IS not_depressed)) THEN Mwheel IS very_small Rule 9 (relating to the transversal or lateral acceleration):

In the case of extreme driving maneuvers it is useful (at the stability limit) also to reduce the reactivity.

IF latacc_abs IS very_large THEN Mwheel IS minus_medium

Figure 3:
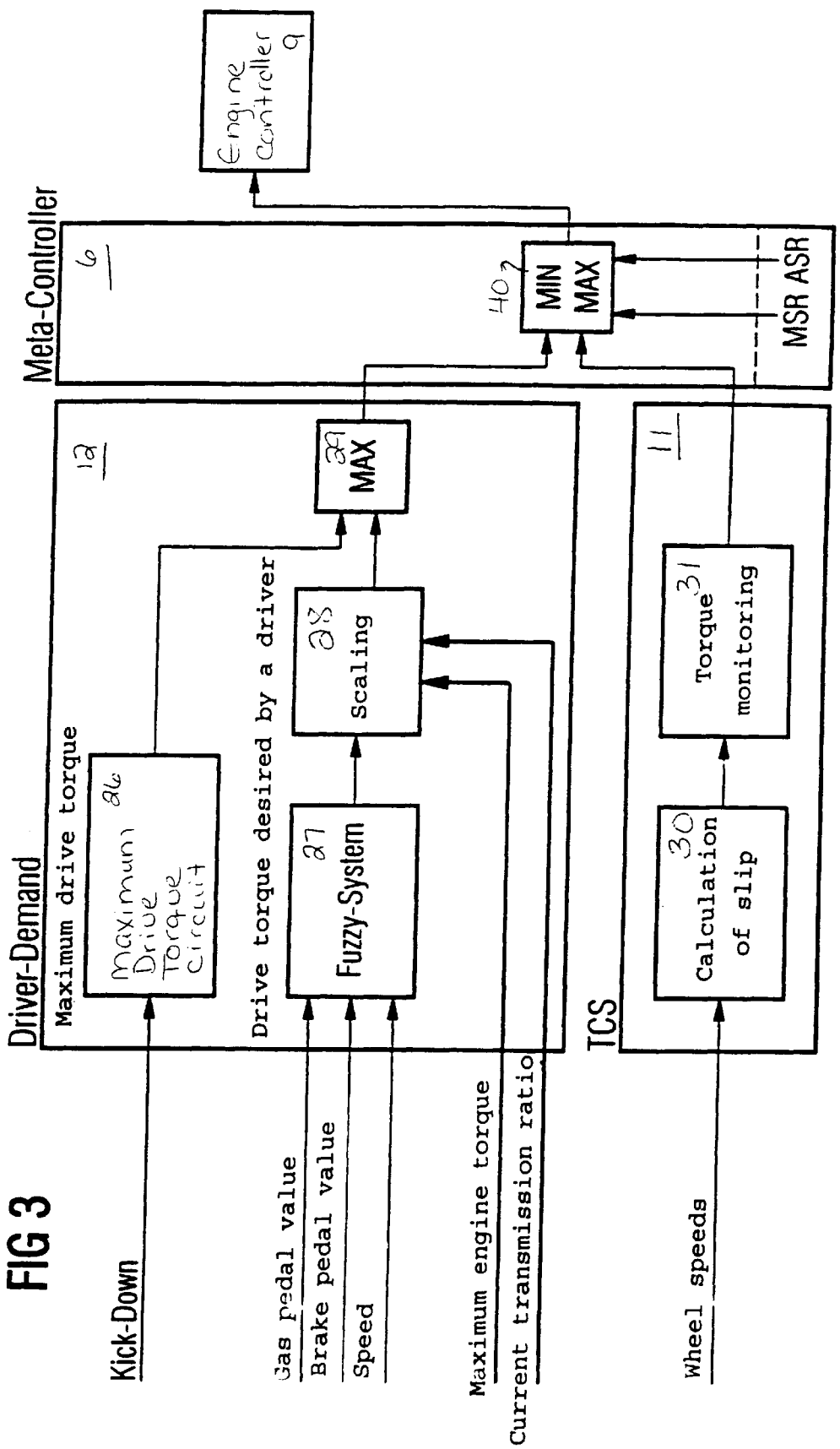
FIG. 3 is a block diagram of a number of components including a scaling circuit of the drive train controller.

FIG. 3 illustrates a simple way of implementing the processing of the torque request in an integrated drive train controller according to the invention. The circuit blocks 6, 9, 11 and 12 from FIG. 1 are illustrated in more detail in FIG. 3. The wheel torque calculator 12—also referred to as driver demand—contains a circuit block 26 which calculates the maximum drive torque when a kick-down signal is received. The kick-down signal is evaluated separately, since the enabling of the maximum engine torque is critical for safety. The wheel torque calculator 12 also contains a fuzzy system 27 which contains the described rule base and receives the input signals which can be seen in the drawing, a scaling circuit 28 explained below and a maximum value former 29 which passes on the greater of the output signals of the circuit block 26 or of the scaling circuit 28 to the control circuit 6. The scaling circuit 28 also receives signals which provide it with information on the maximum engine torque and the current transmission ratio.

The wheel speed signals are fed to the brake controller 11 which includes a traction control circuit (TCS) in which wheel slip calculations are derived. In a wheel slip circuit 30, the slip of the individual wheels 13 is calculated and the wheel torque is subsequently defined in a wheel torque monitoring circuit 31. The output signal from the TCS of the brake controller 11 is passed onto the control circuit 6. The latter contains a maximum/minimum value former 40 which receives the signals from blocks 29 and 31 and, in addition, activation signals of an engine slip controller MSR and a traction controller ASR. Depending on whether the state MSR or ASR is active the greater or the smaller of the aforesaid signals is passed onto the electric engine controller 9.

As a result of the mapping of the physical variables onto the linguistic values (fuzzification), it is possible, as a result of the processing of the rule base (inference formation) and the assignment of the linguistic results to a physical value, for the physical relationship between the input variables and output variables of the fuzzy rule base to be lost under certain circumstances (for example: which throttle valve position corresponds to which driver's desired torque?). For this reason, the output signal of the fuzzy system 27 is scaled in the scaling circuit 28.

Figure 4:
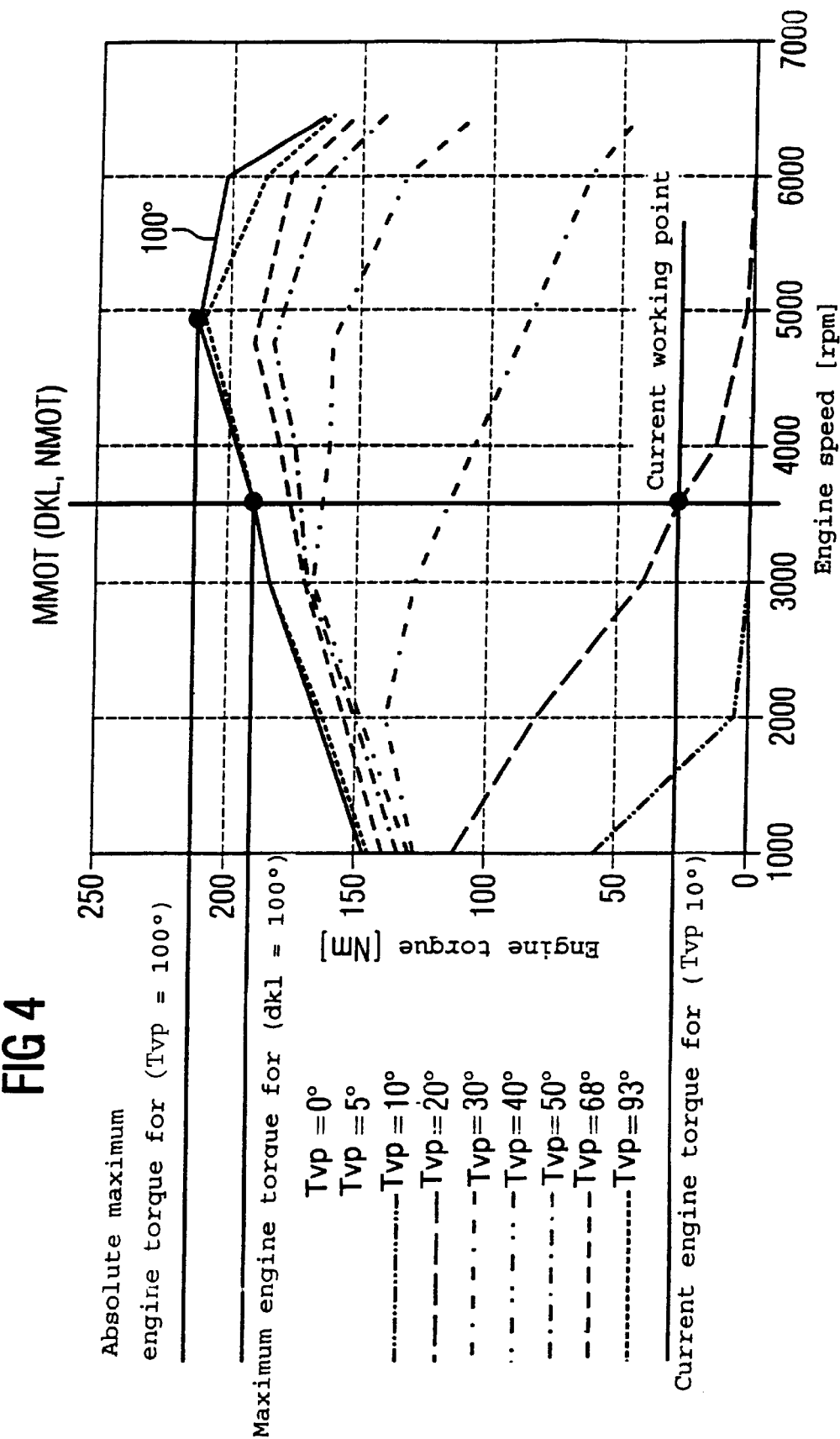
FIG. 4 is a graph explaining a method of operation of the scaling circuit.

There are various possible ways of implementing the scaling of the fuzzy output signal relating to the driver's torque request (FIG. 4). Dependent on the selection of the scaling factor are the maximum torque which the driver obtains and the idle motion which the driver makes in the case of relatively high pedal values without obtaining more engine torque because the maximum engine torque for the current working point has been enabled, and the maximum torque is, however, smaller. The results from the vehicle simulation are used to validate such a rule of concept. A so-called highway cycle is moved through with the simulation vehicle model. The results of the scaling carried out here are illustrated in FIG. 4 as a diagram. The engine speed is plotted on the abscissa and the engine torque $M_{eng}$ is plotted on the ordinate. Their dependence on the throttle valve position TVP is taken into account by the curves for the various TVP angles. The current engine torque, for example at a TVP angle of 10°, the maximum engine torque and the absolute maximum engine torque, for TVP=100°, can be obtained directly from the diagram.

Figure 5:
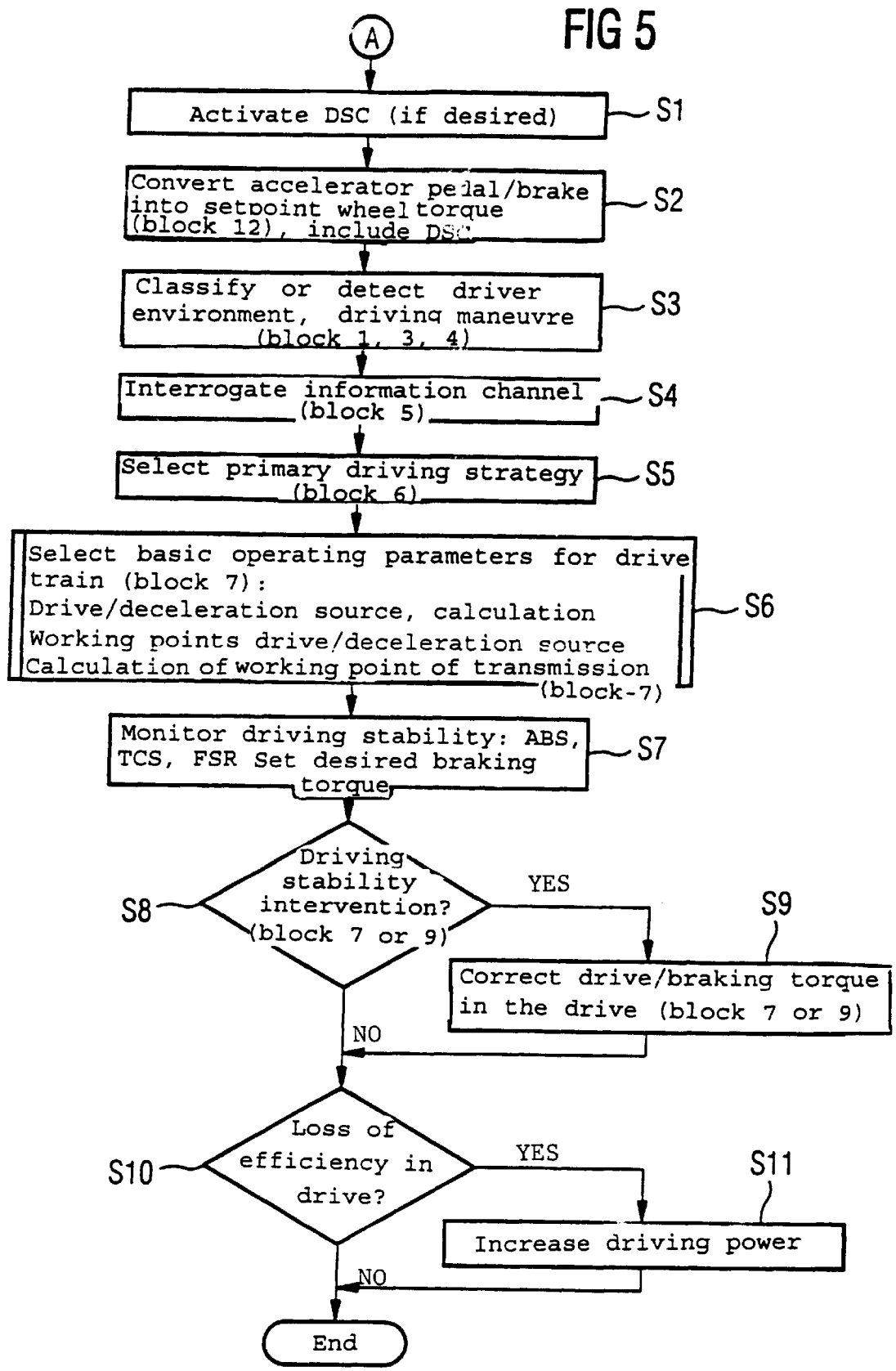
FIG. 5 is a flowchart of a program processed by the drive train controller.

FIG. 5 is a flowchart which is processed by the drive train controller 1 according to the invention. After the start A, the program carries out the following steps S1 to S11:

S1: The driving speed controller DSC is activated, if desired.

S2: The information relating to the accelerator pedal or the brake pedal is converted into a set point wheel torque (block 12). The driving speed controller is also included if appropriate. (The extensive operations explained above with reference to FIGS. 1 to 4 are symbolized here by the step S2 in order to improve the clarity of the flowchart).

S3: The driver, the environment and the driving maneuver is classified or sensed (in blocks 1, 3 and 4).

S4: The information channel 5 is interrogated (in block 6).

S5: A primary driving strategy is selected in block 6.

S6: The base operating parameters for the drive train are selected (in block 7): the drive source or deceleration source, the calculation of the working points of the drive sources and deceleration sources, the calculation of the working point of the transmission (in block 7).

S7: The driving stability is monitored: with ABS, engine power adjusting unit TCS and driving stability controller DSC.

S8: There is an interrogation to determine whether a driving stability intervention is to take place (in block 7 or block 9). If yes, go to S9, If no, go to step S10.

S9: The drive torque or braking torque is corrected in the drive (block 7 or 9).

S10: To determine whether a loss of efficiency is taking place in the drive. If yes, go to step S11, if no go to End S11: The drive power is increased.

END.

Figure 6:
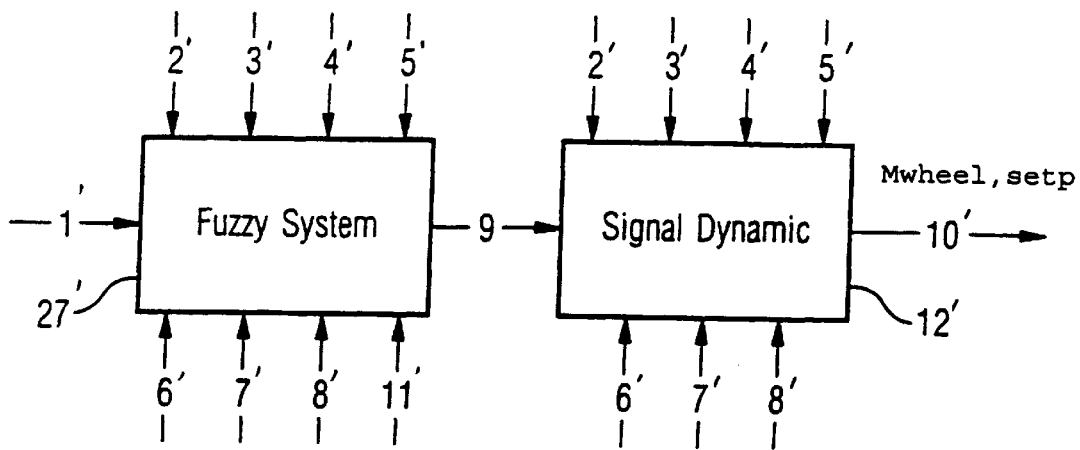
FIG. 6 is a circuit block diagram of the drive train controller.

Another exemplary embodiment of the wheel torque calculator 12' will now be explained in detail with reference to FIG. 6, the signal dynamics which can be seen therein being highly significant. The signal lines are designated by the numerals 1' to 12' and 27' which are used only in this figure. Which signals are transmitted on these lines is given below the figure. The wheel torque calculator 12' carries out dynamic influencing of the signal received from the fuzzy system 27' on a line 9'. The decisive factor is not only which variables influence the set point wheel torque Mwheel_setp, but also how quickly the wheel torque is increased or decreased. Here, use is made of conventional filters (for example of the 1st order), whose time constants are defined by the external influencing variables and thus influence the signal dynamics on line 10'. It is also advantageous to keep the set point wheel torque constant for specific operations or to approximate it to a current value from block 5' in accordance with a prescribed, time-dependent function (also after a phase of keeping constant, for example in the event of a gear change). This avoids the impression that the vehicle is accelerating independently, i.e. without the intervention of the driver.

A plurality of examples of the mode of operation of the wheel torque calculator 12' will now be explained:

A: (Influencing variable road type): in the case of slipperiness, a highly decelerated increase in the wheel torque takes place.

B: (Influencing variable driving style): in the case of a sporty driver, there is a very rapid increase in the wheel torque.

C: (Influencing variable change in state): in the case of gear shifting operations in a transmission with interruption of the traction force, the wheel torque is increased in a decelerated fashion (after the shifting operation there is an approximation to the current prescribed value from the fuzzy system 27') in order to make the gear change more gently, or else the wheel torque is "frozen" for the duration of the shifting operation. In the case of shifting operations in frictionally locking mode, the wheel torque is increased in a decelerated fashion in order to improve the comfort and safety (for example to avoid bucking).

D: (Influencing variable transversal acceleration): there is a decelerated increase in the wheel torque.

E: Another possible way to reduce the set point wheel torque (Mwheel_setp) after up shifting in order to avoid idle motion is to multiply the signal of the set point wheel torque in the steady state (Mwheel_setp, stead) transmitted on the line 9' by the transmission ratio iG, i.e. to arrange a multiplier (not illustrated) between blocks 27' and 12'. This reduces the setpoint wheel torque with increasing gear speed for the same accelerator pedal position.

The invention may now be characterized as follows: the drive train controller 1 (FIG. 1) uses the accelerator pedal position interpreted as the wheel torque or transmission output torque desired by the driver to calculate setpoint values for the torque to be output by the drive train. The drive train controller 1 contains a selector and control circuit 6 in which the desired wheel torque is evaluated together with further operating parameters of the motor vehicle in a fuzzy system 27. The control circuit 6 outputs an output signal $M_{wheel\_setp}$ which defines the wheel torque to be exerted on the roadway by the wheels.

We claim:

1. In a motor vehicle having a drive train including an engine, a transmission, a torque converter and wheels, a braking system with delaying units, a brake pedal and an accelerator pedal, a drive train controller comprising:

a wheel torque calculation circuit to be connected to the accelerator pedal for interpreting a position of the accelerator pedal as one of a desired wheel torque and a desired transmission output torque desired by a driver and for calculating set point values for a torque output of the drive train;

a control circuit having a fuzzy system and a central driving strategy selector circuit, said fuzzy system receiving and evaluating the desired wheel torque, together with operating parameters of the motor vehicle and environmental parameters, for generating a fuzzy output signal;

said central driving strategy selector circuit receiving the fuzzy output signal from said fuzzy system and driving situation parameters of the motor vehicle and generating a wheel torque output signal using prescribable criteria of said central driving strategy selector circuit for adapting a mode of operation of the drive train; and an engine power adjusting unit receiving the wheel torque output signal for determining a set point wheel torque to be exerted on a roadway by the wheels.

2. The drive train controller according to claim 1, wherein the set point wheel torque defines a unique set point wheel torque for each individual wheel of the motor vehicle.

3. The drive train controller according claim 1, including a scaling circuit receiving the fuzzy output signal and generating a scaled fuzzy output signal, said scaling circuit defining an upper limit corresponding to a maximum accelerator pedal position for a respective maximum wheel torque to be output as a function of a driving and an operating situation of the motor vehicle.

4. The drive train controller according to claim 3, including a filter having a type and filter parameters defined as a function of the driving and the operating situation of the motor vehicle, said filter receiving and filtering the scaled fuzzy output signal.

5. The drive train controller according to claim 1, wherein said wheel torque calculation circuit receives input signals from the accelerator pedal and the brake pedal for determining the position of the accelerator pedal and of the brake pedal and generates central control parameters for said engine adjusting unit and the delaying units of the drive train from the input signals.

6. The drive train controller according to claim 1, including a classification device for evaluating sensor signals received from the drive train, classifying operating parameters of the motor vehicle and generating classification device output signals.

7. The drive train controller according to claim 6, wherein said control circuit receives the classification device output signals and a driving strategy is selected in said control circuit with reference to the classification device output signals; and including a plurality of decentralized control units receiving output signals of said wheel torque calculation circuit and of said control circuit, and control signals for at least one of the engine, the transmission, and the brake system are generated from the output signals.

8. The drive train controller according to claim 7, wherein a given set point wheel torque of operating points of the engine, of the transmission, of the brake system and of the torque converter are controlled for fulfilling the following relation:

$$M_{wheel\text{-}setp} = M_{eng\text{-}setp} * i_A * i_G * wv - F_{brake} * r$$

where:

$M_{wheel\text{-}setp}$ is the setpoint wheel torque $M_{eng\text{-}setp}$ is the setpoint engine torque $i_A$ is the differential transmission ratio $i_G$ is the gear transmission ratio r is the wheel radius wv is the amplification factor of the torque converter $F_{brake}$ is the braking force to be set.

9. The drive train controller according to claim 1, wherein the set point wheel torque is kept constant at one value in the event of a gear change.

10. The drive train controller according to claim 1, wherein the set point wheel torque is approximated, in accordance with a prescribed time function, to a current value supplied by said fuzzy system.

11. The drive train controller according to claim 1, wherein the set point wheel torque is approximated, in accordance with a prescribed time function to a current value supplied by said fuzzy system after a phase of remaining constant.

12. The drive train controller according to claim 1, wherein the motor vehicle has a hybrid drive and said control circuit selects a drive source of the hybrid drive.

* * * * *

UNITED STATES PATENT AND TRADEMARK OFFICE
CERTIFICATE OF CORRECTION

PATENT NO. : 6,125,314
DATED : September 26, 2000
INVENTOR(S) : Graf, et al

It is certified that error appears in the above-identified patent and that said Letters Patent is hereby corrected as shown below:

On the title page: Item [30] Foreign Priority: should read
-- 196 48 055.8   November 20, 1996   Germany --.

Signed and Sealed this

Sixteenth Day of January, 2001

Attest:

Q. TODD DICKINSON

Attesting Officer

Commissioner of Patents and Trademarks